United States Patent
Cowan et al.

[11] Patent Number: 5,946,644
[45] Date of Patent: Aug. 31, 1999

[54] STEERING CENTER INDICATOR DEVICE

[75] Inventors: Allan L. Cowan, Stockbridge; Mark A. Froelich, Onsted, both of Mich.

[73] Assignee: Chrysler Corporation, Auburn Hills, Mich.

[21] Appl. No.: 09/050,549

[22] Filed: Mar. 30, 1998

[51] Int. Cl.[6] ................................................. G06F 15/50
[52] U.S. Cl. ........................ 702/151; 702/148; 701/41; 701/43; 180/412
[58] Field of Search .................................... 702/151, 148; 701/44–49, 41, 43; 180/443–449, 422, 412

[56] References Cited

U.S. PATENT DOCUMENTS

| | | | |
|---|---|---|---|
| 4,996,657 | 2/1991 | Shiraishi et al. | 702/151 |
| 5,008,823 | 4/1991 | Takahashi | 701/43 |
| 5,065,323 | 11/1991 | Shiraishi et al. | 701/41 |
| 5,283,740 | 2/1994 | Sato et al. | 701/43 |
| 5,465,210 | 11/1995 | Walenty | 701/41 |
| 5,717,606 | 2/1998 | Hara et al. | 701/44 |
| 5,787,375 | 7/1998 | Madau et al. | 701/41 |

*Primary Examiner*—John Barlow
*Assistant Examiner*—Hien Vo
*Attorney, Agent, or Firm*—Jennifer M. Stec

[57] ABSTRACT

A shaft position indicator in which a collar is formed on and moves on in accordance with a shaft. The collar is placed opposite an optical sensor and includes a notch which activates an optical sensor when the notch is located opposite the sensor. When the notch is opposite the sensor, a driving circuit outputs a voltage. When the notch is not opposite the sensor, the driving circuit outputs 0 voltage. The light source and sensor are placed a distance from the collar equal to the focal length to substantially eliminate interference from ambient light.

7 Claims, 2 Drawing Sheets

STEERING CENTER INDICATOR DEVICE

BACKGROUND OF THE INVENTION

1. Field of the Invention

The present invention relates generally to a shaft position sensor and, more particularly, to an electro-optical position sensor which generates a light signal and detects a return light signal and which is placed so that substantially only light generated by the sensor is detected by the sensor, thereby limiting potential interference caused by ambient light.

2. Description of the Related Art

Many applications require determining the position or orientation of a rotatable shaft. For example, it is often desirable to determine the position of a rotary actuator shaft. Such position information may be become particularly important during power-up of the rotary actuator. Further, it is often desirable to provide a shaft position sensor which can eliminate electrical and optical inputs which may interfere with accurate readings.

In one specific application, many vehicle test tracks rely on robots to drive vehicles around the test track. The use of robots is particularly relevant for vehicle durability testing in which the vehicle is subjected to very extreme road conditions that result in a sufficiently rough ride. Human drivers would not want to regularly be subjected to such extreme driving conditions. In such vehicles, it is particularly useful to determine the position of the steering shaft in order to facilitate operation of the robotically driven vehicle. Determining the center position of the steering shaft is very useful in such systems, especially at power up.

Thus, it is desirable to provide a steering center indicator device which enables determination of a predetermined position, such as a center position, of a shaft.

SUMMARY

A shaft position sensor including a position indicator disk which is connected to and moves in accordance with the shaft. The position indicator disk has a notch which includes a bottom, reflective surface. A light source generates a light signal in the direction of the position indicator disk, and the light signal is reflected by the bottom surface of the notch when the shaft is in a predetermined orientation. The light source is positioned a predetermined distance from the bottom of the notch. A light sensor detects light reflected from the bottom surface of the notch. The light sensor is also positioned the predetermined distance from the bottom of the notch. A circuit activates the light source and indicates when the light sensor detects light reflected from the bottom of the notch. The predetermined distance is the focal length of the light sensor. The light sensor substantially only detects light only at the focal length so that substantially only light reflected from the bottom of the notch is reflected by the light sensor.

Additional objects, features, and advantages of the present invention will become apparent in the following description and the appended claims taken in connection with the accompanying drawings.

DETAILED DESCRIPTION OF THE INVENTION

Figure 1:
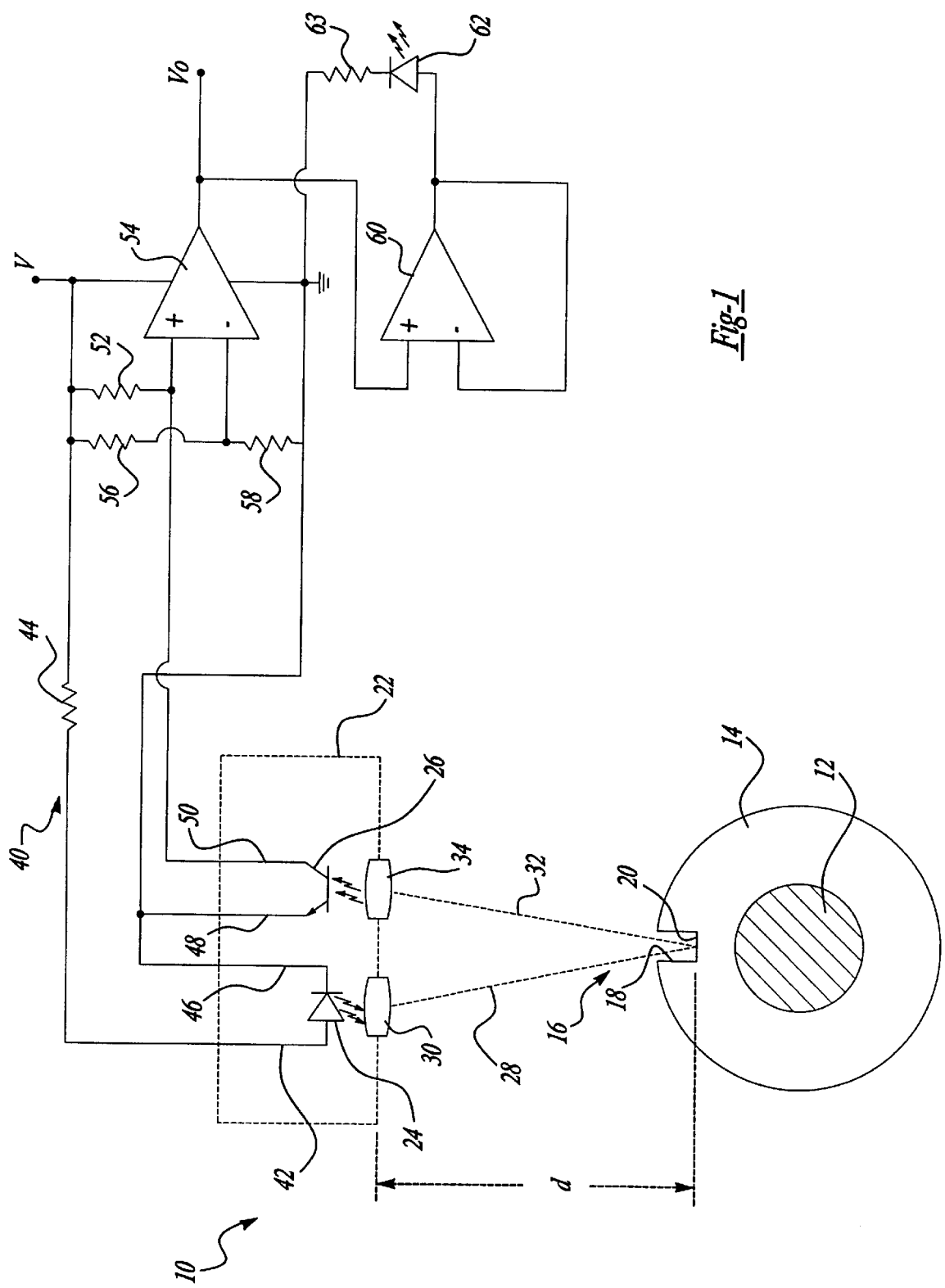
FIG. 1 is a partial schematic diagram arranged in accordance with the principals of the present invention.

With reference to FIG. 1, the steering center indicator device 10 will be described. A shaft 12, shown in cross section, receives a collar 14. The shaft 12 may be any rotatable shaft, such as for a rotary actuator, a steering mechanism, or any other rotatable shaft for which position information is useful. Collar 14 is connected to and rotates in accordance with shaft 12 so that the rotation of shaft 12 causes a corresponding rotation of collar 14. Collar 14 includes a notch 16 having a pair of opposing sides 18 and a bottom 20. Bottom 20 is preferably a surface formed to sufficiently reflect light. In one configuration, notch 16 may be formed with a polished, aluminum insert to increase the reflectivity of bottom 20 of notch 16.

A sensor 22 includes a light source 24 and light sensor 26. Light source 24, such as a light emitting diode (LED), generates a light signal 28 focused by a lens 30. Light signal 28 is output in the direction of collar 14. When light signal 28 illuminates bottom 20 of notch 16, bottom 20 reflects incoming signal 28 as reflected signal 32. Reflected signal 32 is reflected in the direction of sensor 22. Reflected signal 32 impinges upon lens 34 and is detected by light sensor 26. Light sensor 26 is shown herein as a phototransistor which outputs an electrical signal in accordance with the intensity of the reflected signal 32.

A circuit 40 provides a driving signal to light source 24 and determines the output of light sensor 26. Circuit 40 indicates whether light sensor 26 detects light above a predetermined threshold in the reflected signal 32. A voltage V, such as 5 volts direct current (DC), is applied to a positive terminal 42 of light source 24 through a pull-up resistor 44. The negative terminal 46 of light source 24 is connected to ground. The emitter 48 of light sensor 26 is connected to ground. The collector 50 of light sensor 26 is connected to voltage source V through a pull-up resistor 52.

When light sensor 26 detects a light signal, such as reflected signal 32, light sensor 26 is turned on and, a current path to ground is formed through light sensor 26. The current path provides a voltage at collector 50 of light sensor 26. The voltage at collector 50 is input to the positive terminal of a comparator 54. A reference voltage is input to the negative terminal of comparator 54. The reference voltage is generated by a voltage divider formed by a pair of resistors 56 and 58. Resistors 56 and 58 are selected so as to provide a predetermined reference voltage to the negative terminal of comparator 54. When the voltage at collector 50 exceeds the reference voltage, comparator 54 provides an output voltage $V_O=V$. When the voltage at collector 50 is less than the reference voltage, $V_O=0$ volts. $V_O$ is applied to the positive terminal of an output buffer 60. When $V_O=V$ output buffer 60 outputs a voltage that activates the light emitting diode (LED) 62. The negative terminal of LED 62 connects to ground through resistor 63. When $V_O=0$, LED 62 remains off.

In operation, movement of shaft 12 causes a corresponding movement of collar 14. As notch 16 moves so light signal 28 impinges upon bottom 20 of notch 16, reflected signal 32 is output back to sensor 22. Reflected signal 32 is detected by light sensor 26, activating light sensor 26. Activation of light sensor 26 causes a resultant voltage $V_O=V$ to be output by comparator 54.

One feature of the present invention is that the distance between sensor 22 and bottom 20 of notch 16 can be selected in accordance with the focal length of sensor 22 in order to substantially eliminate interference from ambient light. For example, if the focal length of sensor 22 is d, the distance between sensor 22 and bottom 20 of slot of notch 16 can be set at a predetermined length d. More specifically, sensor 22 may be implemented using a SCAN-A-MATIC S13224 optical sensor. This particular optical sensor operates optimally with the distance to target of 0.3 inches. In the embodiment of FIG. 1, the distance d can be set to 0.3 inches in order to optimize operation of the steering center indicator device 10. Further, operation of the device can be optimized by knurling the outer surface of collar 14 and/or painting the outer surface of collar 14 black in order to further reduce interference from ambient light. If ambient light should continue to disrupt operation of steering center indicator device 10, modulation of light signal 28 and demodulation of reflected signal 32 would enable further filtering of the ambient light.

Figure 2:
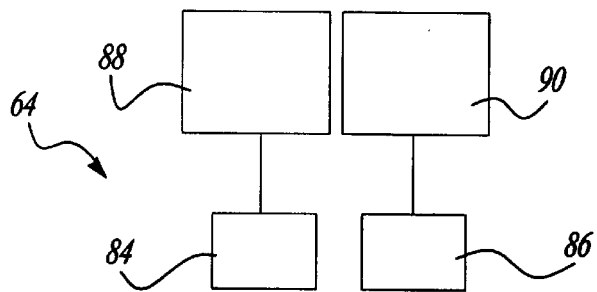
FIG. 2 is a second embodiment of the present invention showing a dual sensor configuration.
Figure 2:
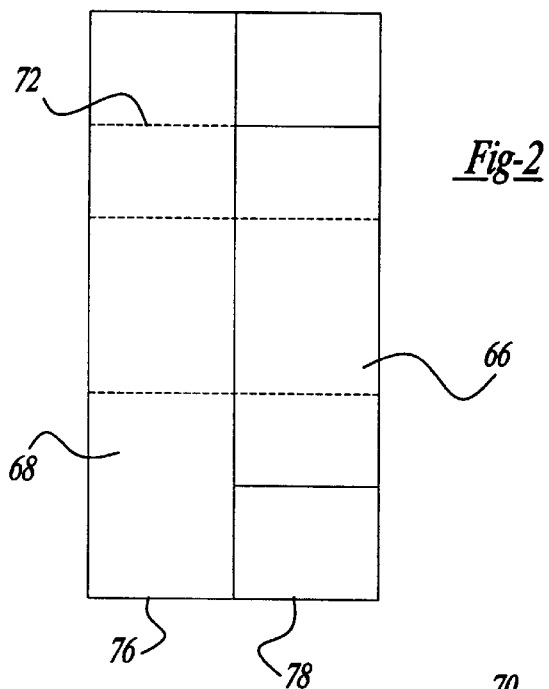
Figure 3:
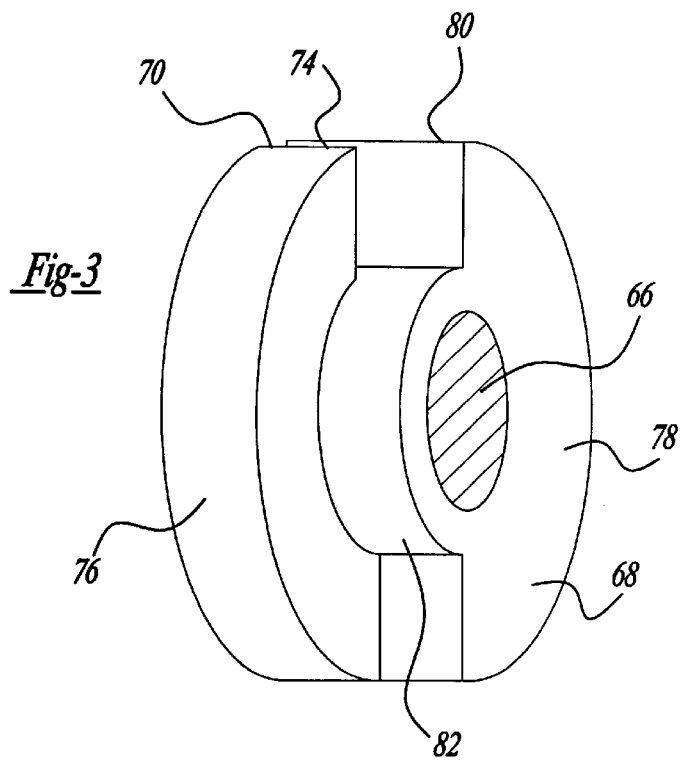
FIG. 3 is a perspective view of the indicator disk of the embodiment of FIG. 2.

FIGS. 2 and 3 depict a second embodiment of the steering center of the indicator device 64. In the embodiment of FIG. 2, a shaft 66 receives a collar 68. Collar 68 includes a notch 70 as described above with respect to FIG. 1, including a bottom 72 and a pair of sides 74. Notch 70 is arranged on a first section 76 of collar 68. Collar 68 also includes a second section 78. Second section 78 includes an outer circumferential surface 80 which has generally the same radius as first section 6. Second section 78 also includes an inner circumferential surface 82 having a radius which is substantially the same as the radius to bottom 72 of notch 70.

Outer circumferential surface 80 and inner circumferential surface 82 each comprise half of second section 78. That is, each circumferential surface 80 and 82 sweeps approximately 180 degrees of second section 78. A pair of sensors 84 and 86 are axially aligned along shaft 66. Sensor 84 operates as described above with respect to FIG. 1 and determines when notch 70 is aligned with sensor 84. Sensor 86 also operates similarly with respect to FIG. 1. However, rather than sensing when a notch is aligned with sensor 86, sensor 86 senses when any portion of inner circumferential surface 82 is aligned with sensor 86. Each sensor 84 and 86 is driven by a circuit 88 and 90, respectively, which operate substantially as described above with respect to circuit 40.

In operation, assume that notch 70 may be positioned up to 180 degrees in either direction from alignment with sensor 84. When notch 70 is positioned in a first direction, one of inner circumferential surfaces 80 or 82 is opposite sensor 86. This causes circuit 90 to output either $V_O=5$ volts or $V_O=0$ volts, depending on which surface opposes sensor 86. Conversely, when notch 70 is up to 180 degrees in the other direction from sensor 84, circuit 90 is in the opposite condition. In this manner, the position of notch 70 can be determined within 180 degrees with respect to sensor 84. This provides a gross position indication. Sensor 84 and circuit 88 operates substantially as described above with respect to FIG. 1.

In view of the foregoing, it can be seen that the present invention provides a novel apparatus for determining the center position of a rotatable shaft. As show in the first embodiment, the apparatus can be designed so that a circuit outputs a signal when the shaft is oriented in a center position. As shown in FIG. 2, a pair of circuits can cooperate to provide signals which indicate the angular position of the center of the shaft within 180 degrees. A second circuit can then determine when the shaft is oriented in the center position.

Although the invention has been described with particular reference to certain embodiments, variations and modifications can be effected within the spirit and scope of the following claims.

What is claimed is:

1. A shaft position indicator, comprising:

a position indicator disk, the position indicator disk operatively connected to and moving in accordance with the shaft, the position indicator disk having a notch formed therein, the notch having a bottom, reflective surface;

a light source for generating a light signal in the direction of the position indicator disk, the light signal being reflected by the bottom surface of the notch when the shaft is in a predetermined orientation, the light source being positioned a predetermined distance from the bottom of the notch;

a light sensor for detecting light reflected from the bottom surface of the notch, the light sensor being positioned the predetermined distance from the bottom of the notch; and a circuit for activating the light source and indicating when the light sensor detects light reflected from the bottom of the notch, wherein the predetermined distance is the focal length of the light sensor, and the light sensor substantially only detects light at the focal length, so that only light reflected from the bottom of the notch is detected by the light sensor.

2. The shaft position indicator of claim 1 wherein the light source is a light emitting diode (LED).

3. The shaft position indicator of claim 1 wherein the light sensor is a phototransistor.

4. The shaft position indicator of claim 1 wherein the light source is a light emitting diode (LED), and the light sensor is a phototransistor, and wherein the light source and the light sensor are packaged as a combined source and sensor unit.

5. The shaft position indicator of claim 1 wherein the light sensor outputs a signal varying in accordance with the intensity of the detected light, and the circuit indicates light detected from the bottom of the notch when the light sensor outputs a signal above a selected threshold.

6. The shaft position indicator of claim 5 wherein the circuit activates a light emitting diode (LED) to indicate that the shaft is in a predetermined position.

7. The shaft position indicator of claim 1 further comprising:

a second light source for generating a light signal in the direction of the second position indicator disk, the light signal being reflected by the reflective surface when the shaft is positioned in a predetermined range of orientations, the light source being positioned a predetermined distance from the reflective surface;

a light sensor for detecting light reflected from the reflective surface, the light sensor being positioned the predetermined distance from the reflective surface; and a circuit for activating the light source and indicating when the light sensor detects light reflected from the reflective surface, wherein the predetermined distance is the focal length of the light sensor, and the light sensor substantially only detects light at the focal length, so that only light reflected from the reflective surface is detected by the light sensor.

* * * * *